United States Patent
Kim et al.

(10) Patent No.: US 10,755,446 B2
(45) Date of Patent: Aug. 25, 2020

(54) SYSTEM AND METHOD FOR PROVIDING CONTENTS USING AUTOMATIC MARGIN CREATION

(71) Applicant: NAVER Corporation, Seongnam-si (KR)

(72) Inventors: Hyo Kim, Seongnam-si (KR); Hyun Chul Lee, Seongnam-si (KR); Ji Han Kim, Seongnam-si (KR); Dai-Hyun Lim, Seongnam-si (KR); Byoungkwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 426 days.

(21) Appl. No.: 15/058,478

(22) Filed: Mar. 2, 2016

(65) Prior Publication Data

US 2016/0292142 A1 Oct. 6, 2016

(30) Foreign Application Priority Data

Apr. 2, 2015 (KR) ........................ 10-2015-0047081

(51) Int. Cl.
*G06T 11/00* (2006.01)
*G06T 11/60* (2006.01)
*G06F 40/14* (2020.01)
*G06F 40/106* (2020.01)

(52) U.S. Cl.
CPC .......... *G06T 11/001* (2013.01); *G06F 40/106* (2020.01); *G06F 40/14* (2020.01); *G06T 11/60* (2013.01)

(58) Field of Classification Search
CPC .. G06F 17/212; G06F 17/2247; G06F 40/106; G06F 40/14; G06T 11/001; G06T 11/60
See application file for complete search history.

(56) References Cited

U.S. PATENT DOCUMENTS

| 6,606,525 B1 | 8/2003 | Muthuswamy et al. |
| 8,274,533 B2 * | 9/2012 | Fillion .................. G06T 3/0012 345/660 |
| 8,819,624 B2 | 8/2014 | Hou |

(Continued)

FOREIGN PATENT DOCUMENTS

| CN | 102193933 A | 9/2011 |
| CN | 102880664 A | 1/2013 |

(Continued)

OTHER PUBLICATIONS

Korean Office Action dated Jan. 12, 2016 by the Korean Patent Office corresponding to Korean patent application No. 10-2015-0047540.

(Continued)

*Primary Examiner* — Stephen S Hong
*Assistant Examiner* — Nicholas Hasty
(74) *Attorney, Agent, or Firm* — Greer Burns & Crain Ltd.

(57) ABSTRACT

A content providing method of a content providing system is executed on at least one computer and includes configuring a page to be provided in content, recognizing an area that is configured using a single color and has a size greater than or equal to a preset size by analyzing the final image that configures the page, and reconfiguring the final image by removing the recognized area.

15 Claims, 14 Drawing Sheets

(56) References Cited

U.S. PATENT DOCUMENTS

| | | | |
|---|---|---|---|
| 8,892,995 B2* | 11/2014 | Hoppenot | G06F 17/00 |
| | | | 715/255 |
| 9,066,036 B2* | 6/2015 | Chen | H04N 1/40093 |
| 2007/0186164 A1* | 8/2007 | Getsch | H04N 1/2166 |
| | | | 715/723 |
| 2009/0158138 A1* | 6/2009 | Ruvini | G06F 17/27 |
| | | | 715/234 |
| 2010/0045691 A1 | 2/2010 | Naito et al. | |
| 2011/0191670 A1 | 8/2011 | Hoppenot et al. | |
| 2012/0176364 A1 | 7/2012 | Schardt et al. | |
| 2013/0162634 A1 | 6/2013 | Baik | |
| 2013/0314421 A1 | 11/2013 | Kim | |
| 2014/0089826 A1* | 3/2014 | Boyd | G06F 3/0481 |
| | | | 715/765 |
| 2014/0245216 A1 | 8/2014 | Saito | |
| 2015/0003690 A1* | 1/2015 | Masuko | G06T 3/40 |
| | | | 382/111 |
| 2015/0382061 A1* | 12/2015 | Maisenbacher | H04N 21/4542 |
| | | | 725/28 |
| 2016/0034144 A1* | 2/2016 | Hsu | G06F 3/04842 |
| | | | 715/763 |

FOREIGN PATENT DOCUMENTS

| | | |
|---|---|---|
| CN | 103793216 A | 5/2014 |
| CN | 103823684 A | 5/2014 |
| CN | 106056641 A | 10/2016 |
| JP | 2003-345556 A | 12/2003 |
| JP | 2004-310326 A | 11/2004 |
| JP | 2006-215925 A | 8/2006 |
| JP | 2010028385 A | 2/2010 |
| JP | 2010066789 A | 3/2010 |
| JP | 2013-250841 | 12/2013 |
| JP | 2014-191719 | 10/2014 |
| KR | 10-2006-0110587 | 6/2007 |
| KR | 10-2011-0019942 | 3/2011 |
| KR | 10-2014-0023596 | 2/2014 |
| TW | 200921417 | 5/2009 |
| TW | 201504831 | 2/2015 |

OTHER PUBLICATIONS

Korean Office Action dated Jan. 12, 2016 by the Korean Patent Office corresponding to Korean patent application No. 10-2015-0047081.

Office Action issued by the Japanese Patent Office in corresponding to Japanese patent application No. 2016-013523, dated Mar. 21, 2017.

Office Action issued by the Patent Office of Taiwan for corresponding TW Application No. 105105378, dated Dec. 29, 2016.

Taiwanese Office Action dated Dec. 23, 2016 by the Taiwanese Patent Office corresponding to Taiwanese patent application No. 105105329.

Japanese Office Action issued in corresponding Japanese patent application No. 2016-013524, dated Mar. 7, 2017.

Chinese Office Action dated Oct. 8, 2018 by the Chinese Patent Office corresponding to Chinese patent application No. 201510964024.3.

Chinese Office Action dated Apr. 26, 2018 by the Chinese Patent Office corresponding to Chinese patent application No. 201510952146.0.

* cited by examiner

SYSTEM AND METHOD FOR PROVIDING CONTENTS USING AUTOMATIC MARGIN CREATION

CROSS-REFERENCE TO RELATED APPLICATION(S)

This application claims priority under 35 U.S.C. § 119 to Korean Patent Application No. 10-2015-0047081 filed on Apr. 2, 2015, in the Korean Intellectual Property Office (KIPO), the entire contents of which are incorporated herein by reference.

BACKGROUND

Field

One or more example embodiments of the present invention relate to a system and a method for providing content using automatic margin creation.

Description of Related Art

This section provides background information related to the present disclosure which is not necessarily prior art.

The word "webtoon", a synthetic word of "web" and "cartoon", implies a cartoon distributed by way of the Internet. For example, Korean Patent Publication No. 10-2006-0110587 discloses a cartoon service providing method and system using a network that creates a cartoon or read the created cartoon through a webpage including a cartoon authoring tool.

SUMMARY

This section provides a general summary of the disclosure, and is not a comprehensive disclosure of its full scope or all of its features.

Some example embodiments of the disclosure provide a content providing system, method, and/or non-transitory computer-readable medium that provide content including a motion effect by applying the motion effect to at least one layer on a page having a plurality of layers, and enhance a loading performance of providing content and reduce a network usage rate by merging layers to which the motion effect is not applied into a single image.

Some example embodiments also provide a content providing system, method, and/or non-transitory computer-readable medium that configure content by automatically recognizing a preset size of an area having the same color as a color of a background and by automatically segmenting and thereby storing a page based on the recognized area when a size of the page is greater than or equal to a preset size.

Some example embodiments also provide a content providing system, method, and/or non-transitory computer-readable medium that reduce a resource size of a final image and a network usage rate, and enhance a loading performance by removing a specific color of an area from the final image and by providing content to display a color of a background set to a service page on which content such as webtoons is displayed through the removed area, when at least a preset size of an area having the specific color is present on the final image.

According to at least one example embodiment, there is provided a content providing method of a content providing system, the method being executed on at least one computer and comprising configuring a page to be included in content, recognizing an area that is configured using a single color and has a size greater than or equal to a preset size by analyzing the final image that configures the page, and reconfiguring the final image by removing the recognized area.

The single color may be the same as a color of a background set to a service page on which the content is displayed, and the color of the background set to the service page may be displayed through a margin created by removing the recognized area.

The content providing method may further include changing a color of a background set to a service page on which the content is displayed, with the single color, in response to the single color being different from the color of the background set to the service page. The changed color of the background may be displayed through a margin created by removing the recognized area.

The content providing method may further include recognizing a second size of an area having the same color as the color of the background from the page in response to the size of the page being greater than or equal to a first size, and segmenting the page based on the recognized second size of the area.

According to at least one example embodiment, there is provided a non-transitory computer-readable medium storing a program to implement a content providing method comprising configuring a page to be included in content, recognizing an area that is configured using a single color and has a size greater than or equal to a preset size by analyzing the final image that configures the page, and reconfiguring the final image by removing the recognized area.

In the non-transitory computer-readable medium, the single color may be the same as the color of a background set to a service page on which the content is displayed, and the color of the background set to the service page is displayed through a margin created by removing the recognized area.

In the non-transitory computer-readable medium, the content providing method may further comprise changing the color of a background set to a service page on which the content is displayed, with the single color, in response to the single color being different from the color of the background set to the service page, and the changed color of the background may be displayed through a margin created by removing the recognized area.

In the non-transitory computer-readable medium, the content providing method may further comprise recognizing the second size of an area having the same color as a color of a background from the page in response to the size of the page being greater than or equal to the first size, and segmenting the page based on the recognized second size of the area.

According to at least one example embodiment, there is provided a content providing system configured as at least one computer, the content providing system comprising a page configurer which is configured to configure a page to be included in content, a marginal area recognizer configured to recognize an area that is configured using a single color and has a size greater than or equal to a preset size by analyzing the final image that configures the page, and a reconfigurer which is configured to reconfigure the final image by removing the recognized area.

The single color may be the same as the color of a background set to a service page on which the content is displayed, and the color of the background set to the service page may be displayed through a margin created by removing the recognized area.

The content providing system may further include a color changer configured to change the color of a background set to a service page on which the content is displayed, with the single color, in response to the single color being different from the color of the background set to the service page. The changed color of the background may be displayed through a margin created by removing the recognized area.

The content providing system may further include a background recognizer configured to recognize a second size of an area having the same color as the color of a background from the page in response to a size of the page being greater than or equal to a first size; and a page segmenter configured to segment the page based on the recognized second size of the area.

According to example embodiments, it is possible to provide content including a motion effect by applying the motion effect to at least one layer on a page having a plurality of layers, and to enhance a loading performance of providing content and to reduce a network usage rate by merging layers to which the motion effect is not applied into a single image.

Also, according to example embodiments, it is possible to configure content by automatically recognizing a preset size of an area having the same color as the color of a background and by automatically segmenting and thereby storing a page based on the recognized area when the size of the page is greater than or equal to a preset size.

Also, according to example embodiments, it is possible to reduce a resource size of the final image and a network usage rate, and to enhance the loading performance by removing a specific color of an area from the final image and by providing content to display the color of a background set to a service page on which content such as webtoons is displayed through the removed area, when the preset size of an area having the specific color is present on the final image.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
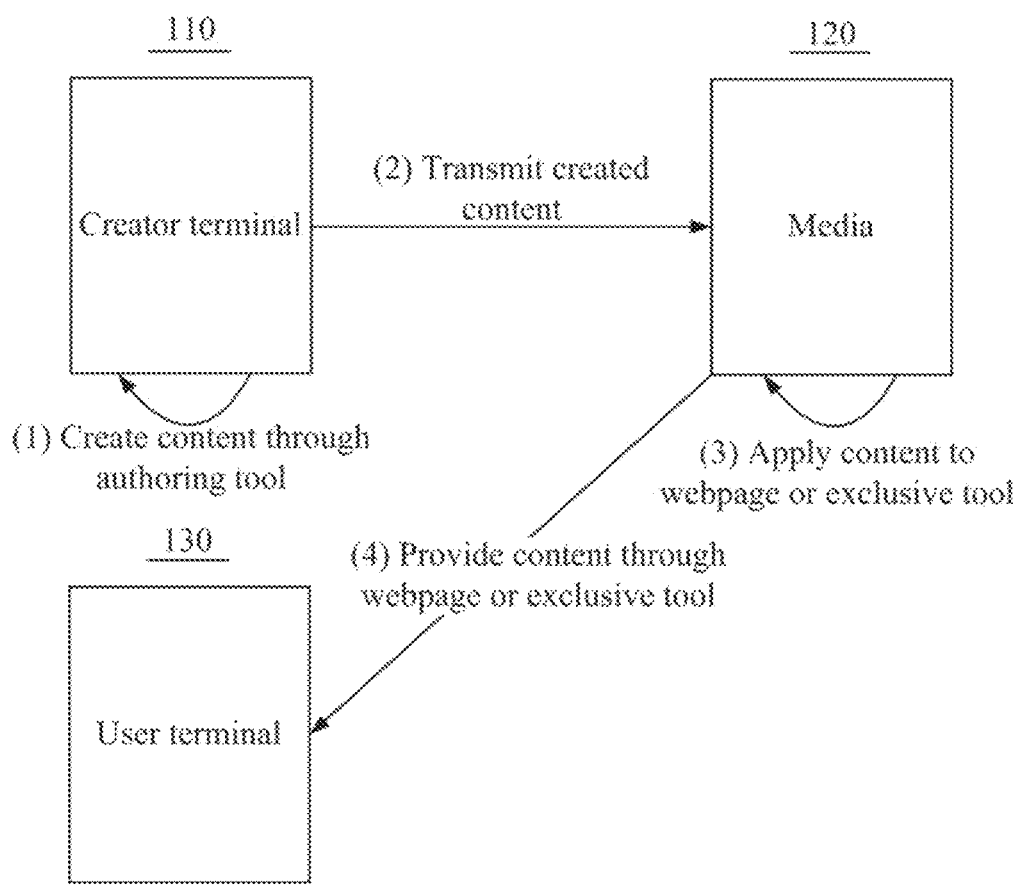
FIGS. 1 and 2 are diagrams illustrating examples of an operation environment of a content providing system according to exemplary embodiments.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments of the present disclosure will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a content providing system and a content providing method that provide content capable of producing a variety of motion effects, and more particularly, to technology for enhancing the loading performance of loading a corresponding page in content and reducing a network usage rate by merging, into an image, layers to which a motion effect is not set among a plurality of layers constituting a single page and thereby creating the content. Further, example embodiments relate to technology for reducing the resource size of the final image by automatically segmenting a page having a significantly large size or by automatically including a margin.

Figure 2:
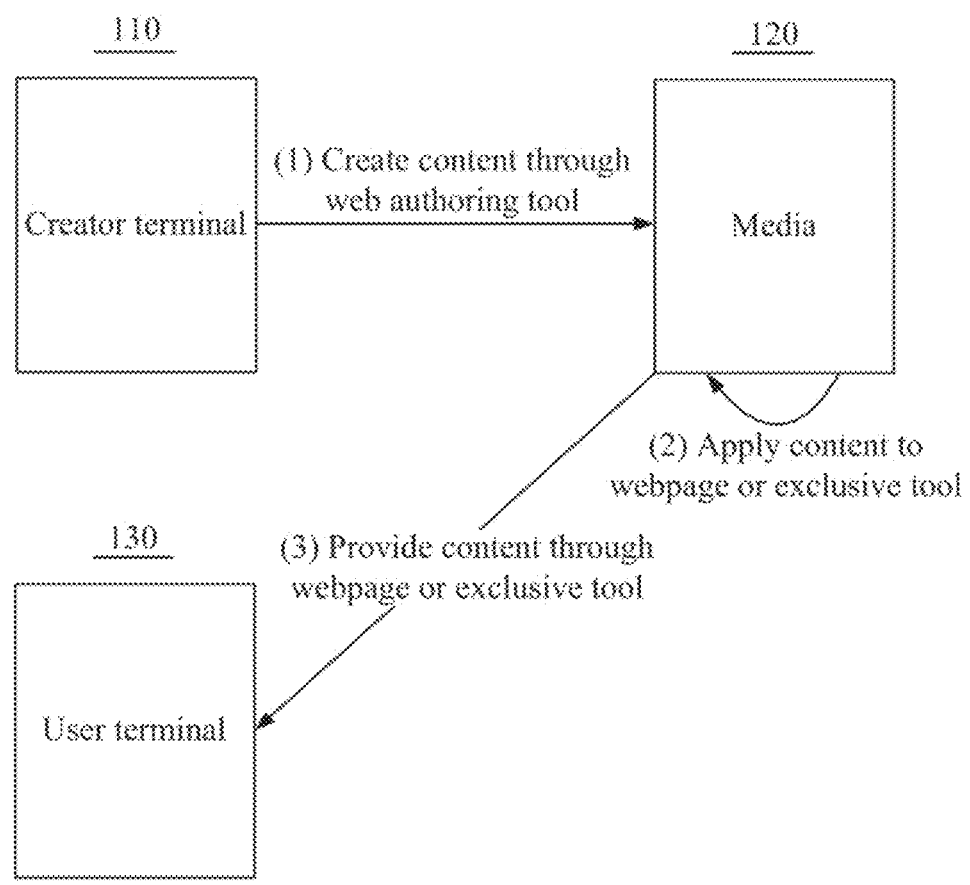

FIGS. 1 and 2 are diagrams illustrating examples of an operation environment of a content providing system according to the embodiments of the present disclosure.

Referring to FIG. 1, a creator terminal 110 refers to a terminal used by a creator that creates content such as webtoons, and indicates a device in which an authoring tool required to create content is installed and capable of connecting to media 120 over a network and performing communication. The media 120 may indicate a server device that provides the content of the creator to a user terminal 130 through a webpage or an exclusive tool or a plurality of server devices connected to each other. The user terminal 130 indicates a device that requests the media 120 for content, and receives and displays the requested content.

An example of providing content in FIG. 1 may proceed as follows:

(1) A creator may create content through an authoring tool installed in the creator terminal 110. The authoring tool may be installed in the creator tool 110 using a file that is downloaded through the media 120 or a server associated with the media 120. The creator may create the content using the authoring tool.

(2) The creator terminal 110 may transmit the created content to the media 120. For example, the media 120 may provide the creator terminal 110 with a page through which the creator terminal 110 may upload the content. The creator terminal 110 may upload a file including the content using a file upload function of the provided page.

(3) The media 120 may apply the content to a webpage or an exclusive tool. For example, the media 120 may apply the content so that the content may be displayed through the webpage to which the content is to be provided or the exclusive tool that enables a view of the content.

(4) The media 120 may provide the content through the webpage or the exclusive tool. For example, the user terminal 130 may request specific content through connection to a website of the media 120 or may request the media 120 for the specific content through the exclusive tool that is installed in the user terminal 130 and enables a view of content. In this case, the media 120 may provide a webpage to which the requested content is applied to the user terminal 130 or may provide the content to be displayed through the exclusive tool installed in the user terminal 130.

Dissimilar to the example of FIG. 1, FIG. 2 illustrates an example in which the creator terminal 110 creates content through a web providing tool that is provided as an application on a web, instead of using the authoring tool installed in the creator terminal 110 and the created content is immediately uploaded to the media 120. In this instance, the process of providing the content uploaded to the media 120 to the user terminal 130 may proceed in the same manner as the foregoing description.

The content providing system according to the embodiments of the present disclosure may correspond to the creator terminal 110 in which the authoring tool is installed or the media 120 that provides a web authoring tool.

Figure 3:
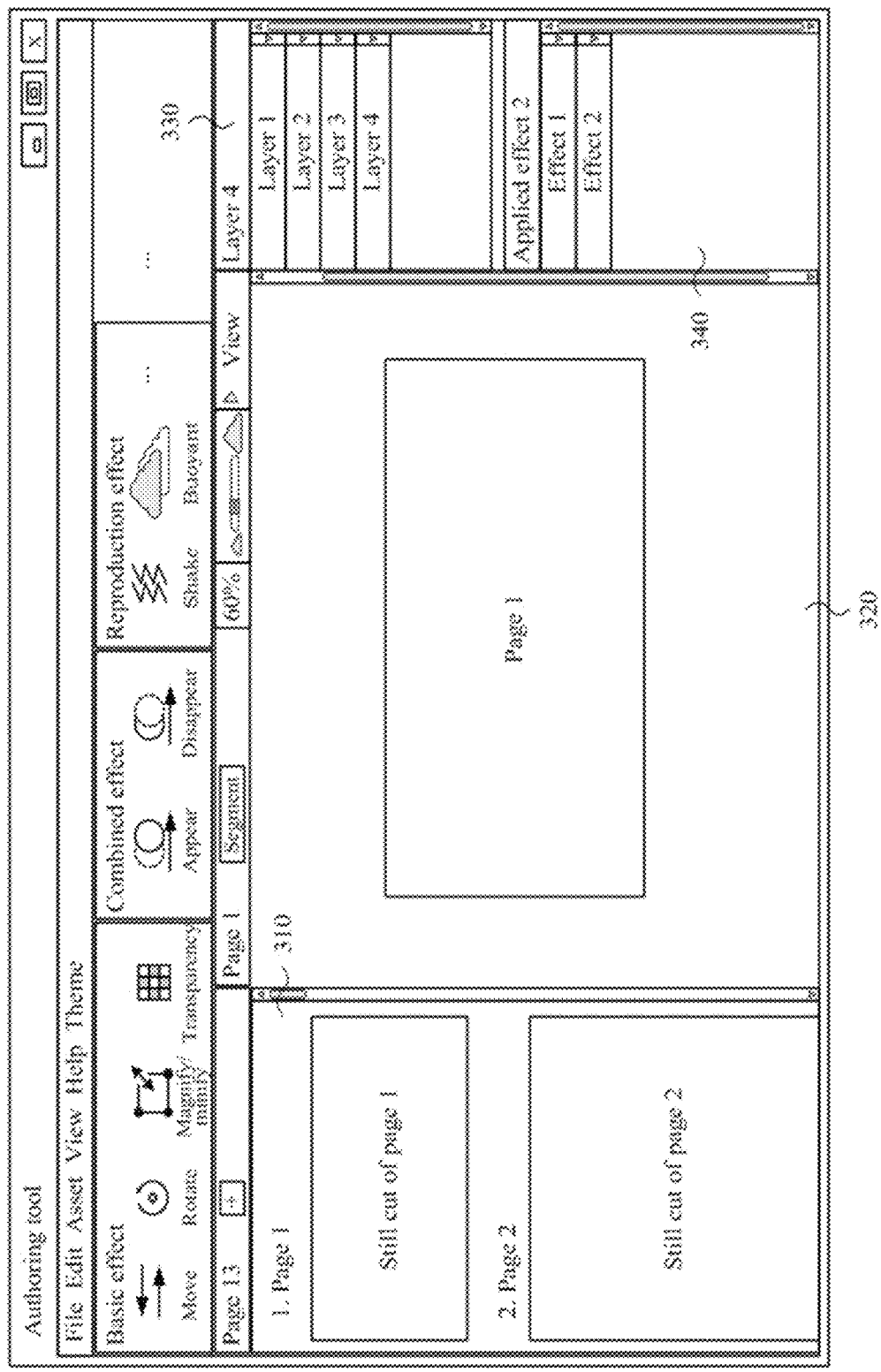
FIGS. 3 and 4 illustrate examples explaining an authoring tool for creating content according to exemplary embodiments.
Figure 4:
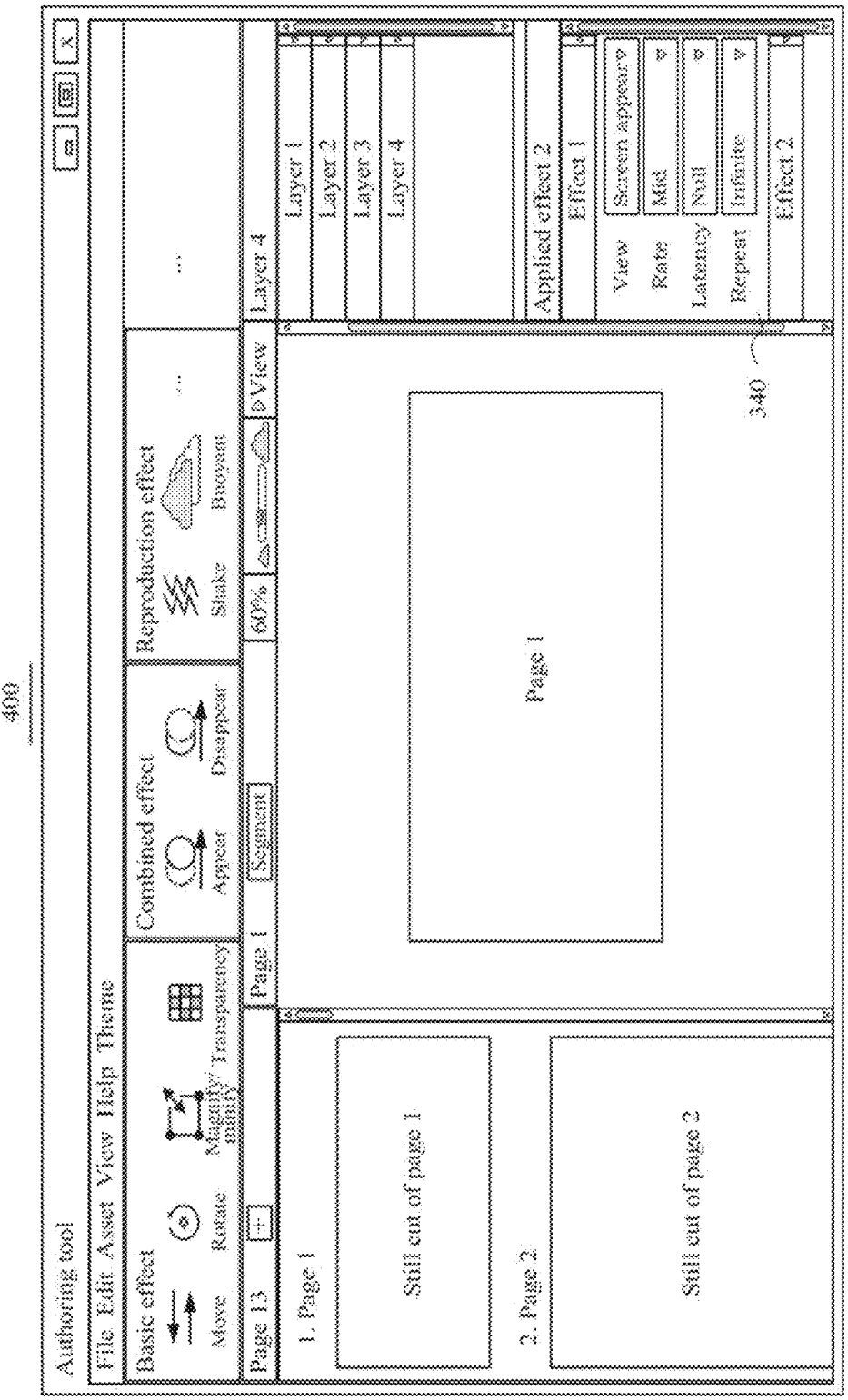

FIGS. 3 and 4 illustrate examples for explaining an authoring tool for creating content according to the embodiments. FIG. 3 illustrates a screen 300 on which interfaces of the authoring tool are displayed. A single item of content may be configured as one or more pages. A single page may be configured as one or more layers. The screen 300 displays an interface capable of applying a variety of effects, for example, a "basic effect", a "combined effect", a "reproduction effect", etc., to an image, for example, a wallpaper image, an object image, a text image, etc., that configures a single layer. For example, abstract information such as a page identifier, still cuts of pages, etc., about pages constituting content may be included in a page list area 310. Further, a still cut of a single page among the pages constituting the content may be displayed on a page display area 320. Information, such as a layer identifier, an interface for determining whether to display a layer, a layer still cut, etc., about layers configuring the page displayed on the page display area 320 may be displayed on a layer list area 330. Also, information about effects set to layers of the layer list area 330 may be displayed on an effect display area 340.

A creator may simply set a desired effect by selecting a page and a layer and then pushing an effect button, for example, "move", "turn", "appear", "shake", etc., displayed on the upper portion of the screen 300. Also, the creator may further precisely control and set individual effects through the effect display area 340.

FIG. 4 illustrates a screen 400 on which a variety of preset detailed effects, such as a point in time at which an effect is to be applied, a rate at which an image moves in response to the effect, an iteration of the effect, etc., for the individual effects, are selected through the effect display area 340. The selectable detailed effects may vary based on an effect type.

Effects may include a motion effect for controlling the motion of an image. Further, the effects may include a variety of effects, for example, an effect of causing the user terminal 130 to vibrate, an effect of outputting a sound from the user terminal 130, and the like.

Figure 5:
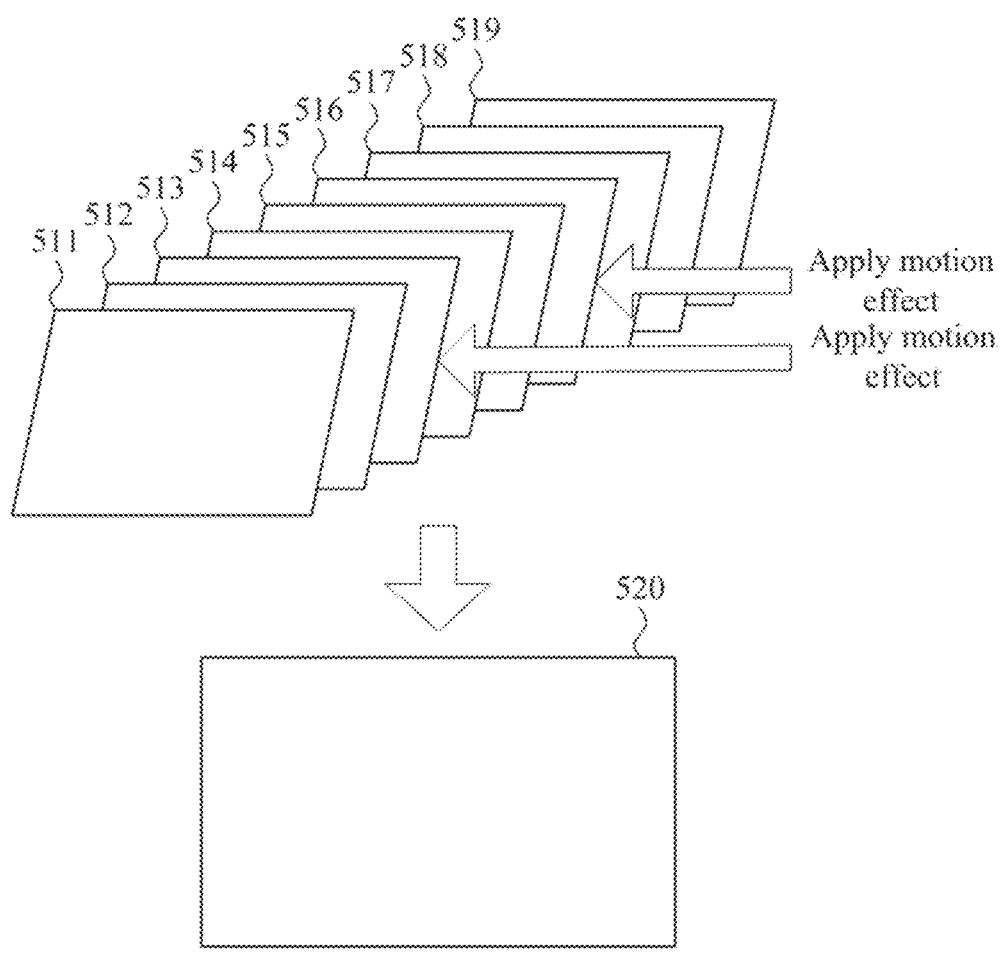
FIGS. 5 through 7 illustrate examples of displaying a plurality of layers according to exemplary embodiments.
Figure 6:
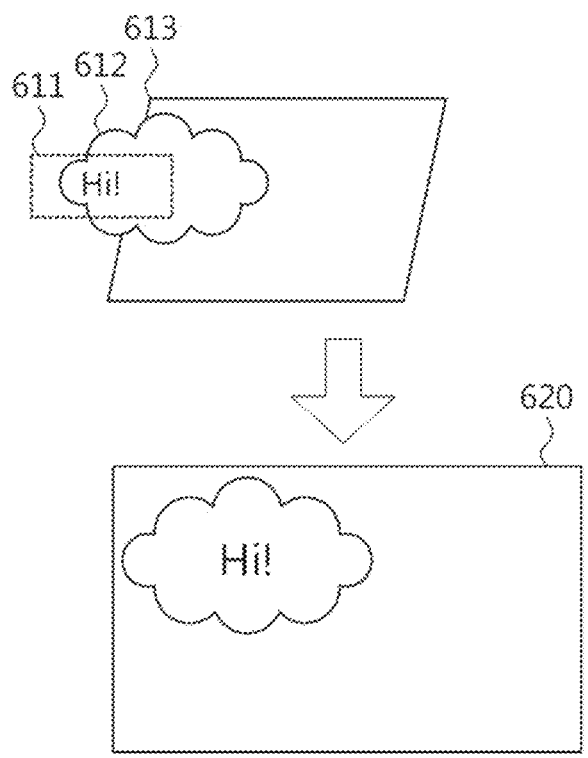
Figure 7:
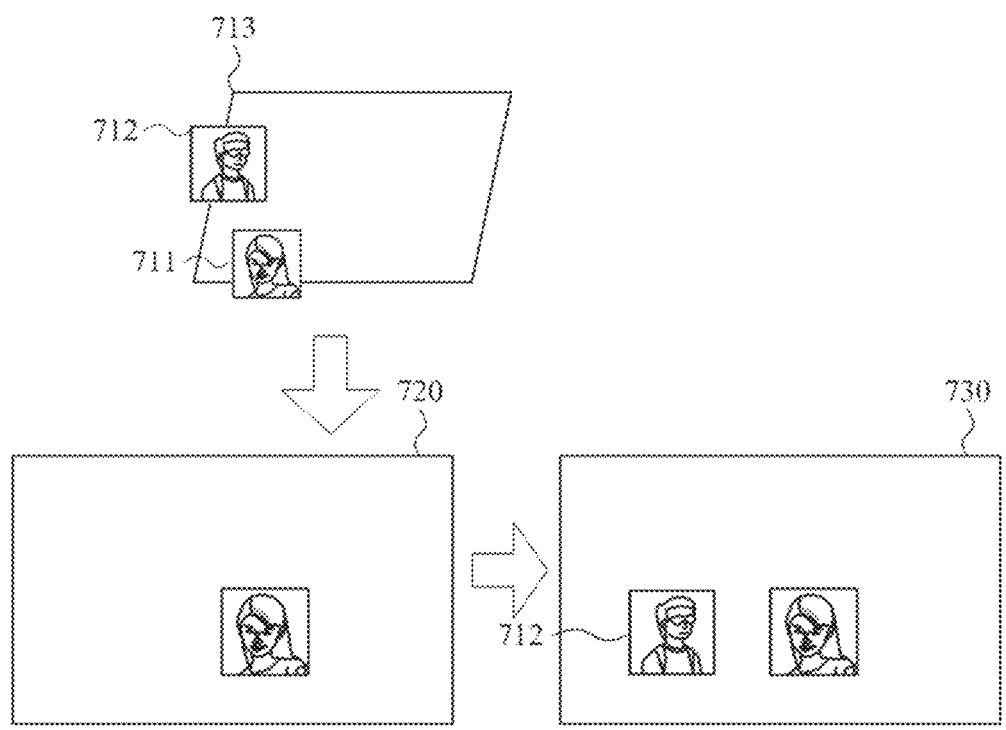

FIGS. 5 through 7 illustrate examples for displaying a plurality of layers according to the embodiments.

FIG. 5 illustrates an example in which layers 511, 512, 513, 514, 515, 516, 517, 518, and 519 are provided in the same shape with the same size, and configure a single page 520.

Layers configuring a single page may also be provided using different sizes and shapes. For example, FIG. 6 illustrates a layer 613 for a background, a layer 612 in a shape of a speech bubble, and a layer 611 for letters to be included in the speech bubble. Here, the layers 611, 612, and 613 are combined to configure a single page 620.

FIG. 7 illustrates an example in which the effect "appear" is applied to a specific layer 712. In detail, FIG. 7 illustrates an example in which only two layers 711 and 713 are displayed when a front page 720 is displayed and a remaining layer 712 is displayed on a page 730 in response to the effect "appear" after a set period of time has elapsed. The motion effect may be set to at least one of a plurality of layers that configures a page.

Referring again to FIG. 5, a motion effect is applied to two layers 513 and 516 among the layers 511 through 519. That is, the motion effect is not applied to the remaining layers 511, 512, 514, 515, 517, 518, and 519.

Here, if all of layers are provided by setting the layers as individual images, it may increase a network usage rate compared to an example of providing a single final image. Further, the loading performance may be degraded when the user terminal 130 loads content. However, information of each layer and information about an effect applied to each layer may need to be transferred to achieve a variety of effect displays.

Accordingly, according to the exemplary embodiments, there is provided technology for merging consecutive general layers among remaining general layers excluding layers to which a motion effect is set.

For example, referring to FIG. 5, the content providing system according to the present embodiments may verify whether a motion effect is set to layers sequentially from the bottom layer 519 to the top layer 511, may create a single merged image by merging consecutive layers to which the motion effect is not set, and may create layers to which the motion effect is set into individual images, and thereby provide the created images. That is, the content providing system may create a single merged image by merging the layers 519, 518, and 517, and may create the layer 516 to which the motion effect is applied into an individual image. The content providing system may create a single merged image by merging the layers 515 and 514, may create the layer 513 into an individual image, and may create a single merged image by merging the layers 512 and 511.

For example, instead of creating and thereby providing nine layers as nine images, the nine layers may be created into five images including three merged images and two individual images whereby the five images may be provided.

Accordingly, it is possible to reduce the resource size of the final image and the network usage rate, and to enhance the loading performance.

Figure 8:
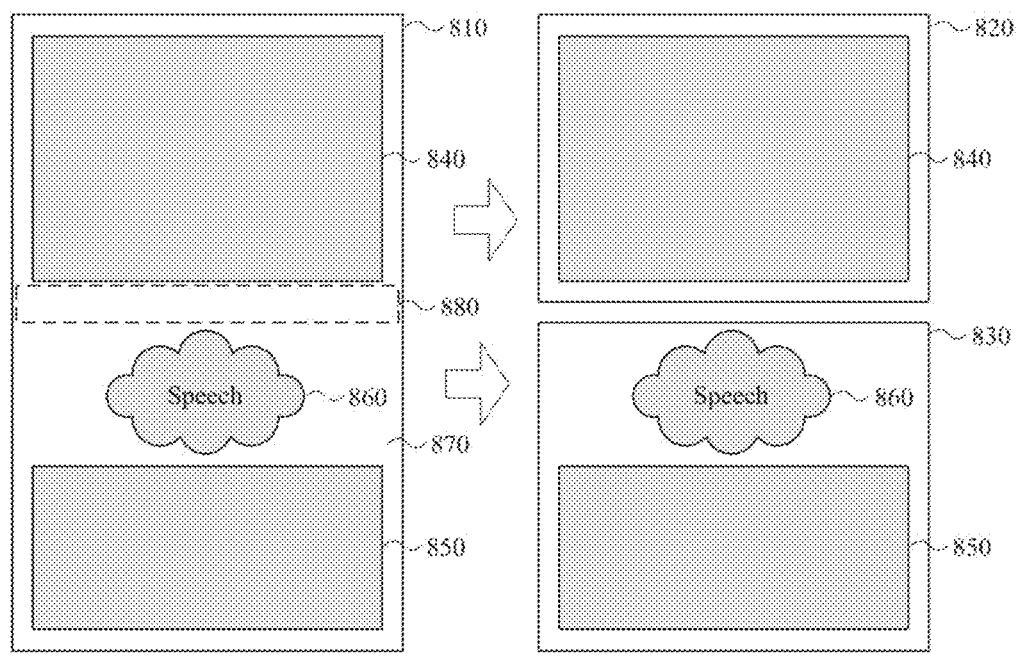
FIG. 8 illustrates an example of automatically segmenting a page according to one embodiment.

FIG. 8 illustrates an example of automatically segmenting a page of content according to one embodiment. FIG. 8 illustrates an example of segmenting a single page 810 into two pages 820 and 830 when the page 810 has a size greater than or equal to a preset first size.

Referring to FIG. 8, the page 810 includes two display areas 840 and 850 and a single speech balloon area 860 on the background of the page 810 and the remaining area is configured as a display area 870 having the same color as the color of the background. Here, the display area 870 is also an image area having the same color as the color of the background.

When creating content, the content providing system (described below with respect to FIGS. 11 and 13) may recognize a second size of an area having the same color as the color of the background by performing image processing of final pages of the content. In FIG. 8, a boxed area 880 indicated with dotted lines may represent an area recognized as the second size by the content providing system. If the page 810 is unconditionally segmented based on a preset size, an image segmentation undesired by a creator may occur. Accordingly, the content providing system may segment the page 810 based on the recognized area, i.e., the boxed area 880, thereby segmenting a relatively large size of a page within the intent of the creator and enhancing the loading performance at the user terminal 130. If the second size of the area is not recognized, the page 810 may be used without performing page segmentation.

Figure 9:
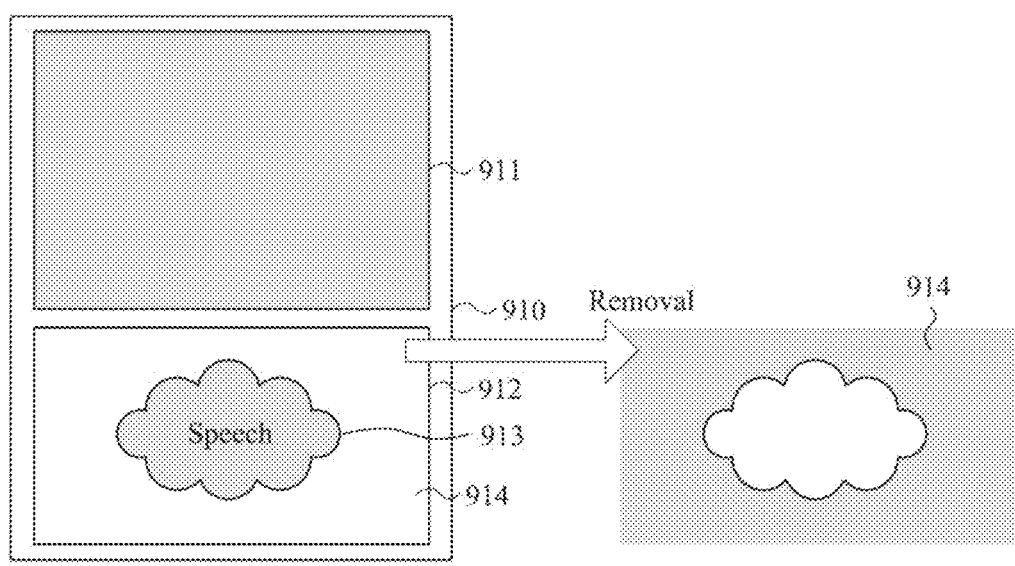
FIG. 9 illustrates an example of automatically creating a margin according to another embodiment.

FIG. 9 illustrates an example of automatically creating a margin on a page of content according to another exemplary embodiment. FIG. 9 illustrates an example in which a page 910 includes two display areas 911 and 912 and a speech balloon area 913 is included in the display area 912. Here, the remaining area 914 excluding the speech balloon area 913 in the display area 912 has the same color as the color of the background of the page 910.

In this example, the content providing system recognizes at least the preset size of an area having the same color as the color of the background and may remove the recognized area. For example, the remaining area 914 may also be recognized as an image, thereby increasing the resource size of the final image. That is, the content providing system may recognize and remove the remaining area 914 from the page 910. In this case, the remaining area 914 may be filled with the background. As described above, since the color of the remaining area 914 is the same as the color of the background, the remaining area 914 would be displayed along with the rest of the page 910. However, since a margin is created by removing an image corresponding to the remaining area 914 by the content providing system, the size of the final image may be reduced.

Here, the background may include a background of a webpage on which content is displayed. For example, when displaying content such as webtoons through a webpage, a removed area of a page may be filled with the background of the webpage. That is, a marginal portion may be represented using the same color as a color of the background of the webpage. Thus, the final image viewed by a user may be the same, whereas the size of the final image may be reduced by a margin created by removing an image. Accordingly, it is possible to reduce the network usage rate and to enhance the loading performance.

Further, as described above, content may be provided to the user through an exclusive tool. In this example, the color of a background set to the exclusive tool may be displayed on the marginal portion. As described above, the color of the background to be displayed on the marginal portion may be expanded to the color of a background of a service page on which the content is displayed.

Figure 10:
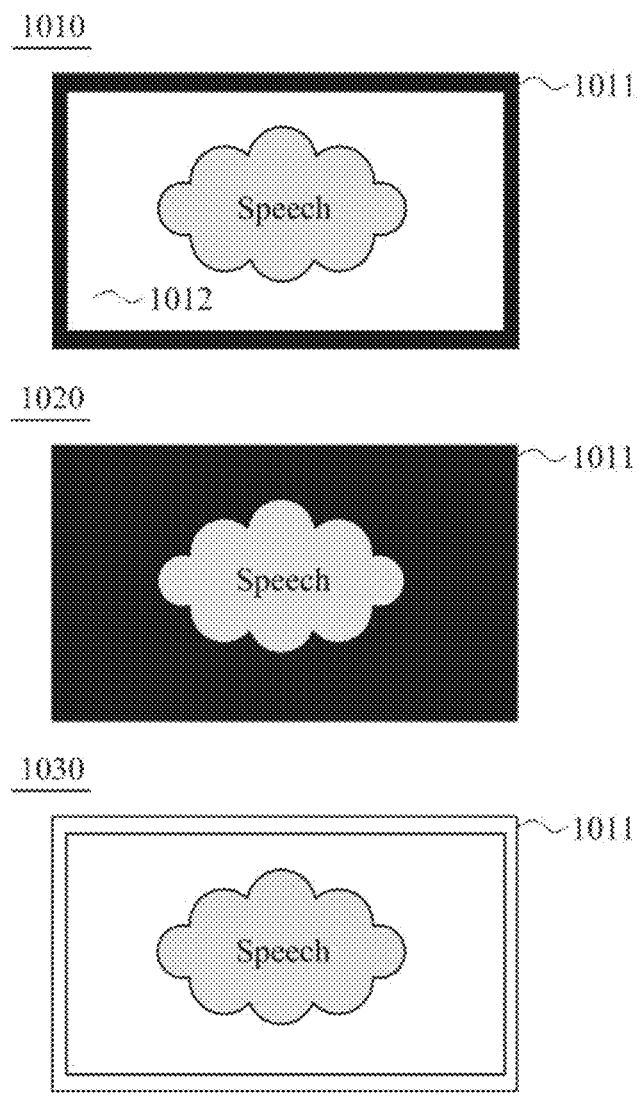
FIG. 10 illustrates another example of automatically creating a margin according to further embodiment.

FIG. 10 illustrates another example of automatically creating a margin according to yet another embodiment. FIG. 10 illustrates an example in which a first page 1010 includes a background 1011 in black and an image including a speech balloon on a display area. Here, the image includes at least a preset size of a white area 1012.

In this example, the content providing system recognizes at least the preset size of the white area 1012 and removes the recognized white area 1012 from the final image when creating content. Here, the first page 1010 may be replaced with a second page 1020 by displaying the removed white area 1012 using a black color that is the same as the background 1011 of the page 1010.

In this instance, the content providing system changes the color of the background 1011 with the color of the removed area. In this example, the second page 1020 may be replaced with the third page 1030. Here, the size of an image on the display area may be reduced in response to removing the white area 1012. That is, a resource size of the final image may be reduced.

Even in this case, the background 1011 may include a background of a webpage on which content is displayed. According to the example embodiments, since the color of the background of the webpage is changed to be the same as the original color of the removed area, it is possible to reduce the network usage rate and to enhance the loading performance of the final image while providing the same content.

As described above, according to example embodiments, the color of the background may be expanded to the color of the background of a service page on which content is displayed.

Figure 11:
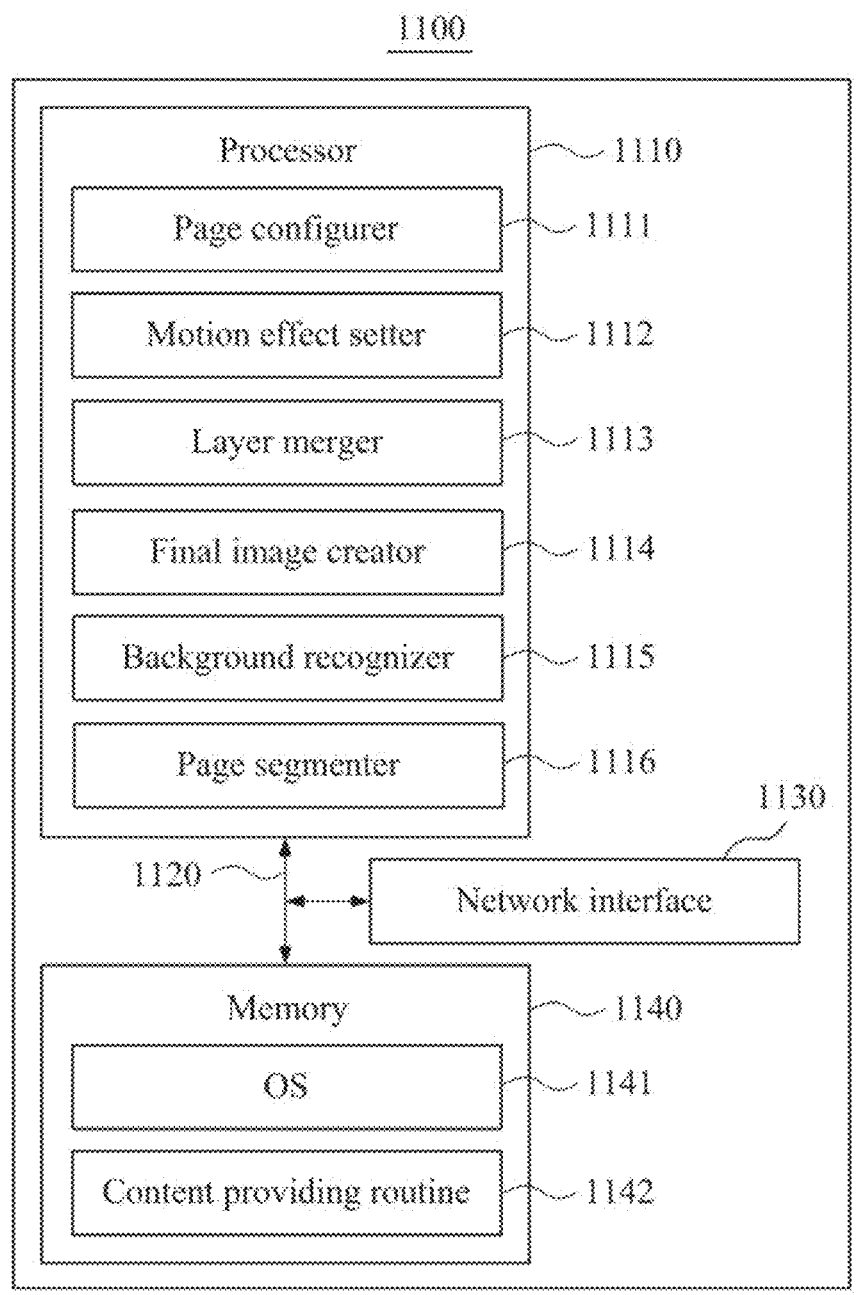
FIG. 11 is a block diagram illustrating of a content providing system according to an exemplary embodiment.
Figure 12:
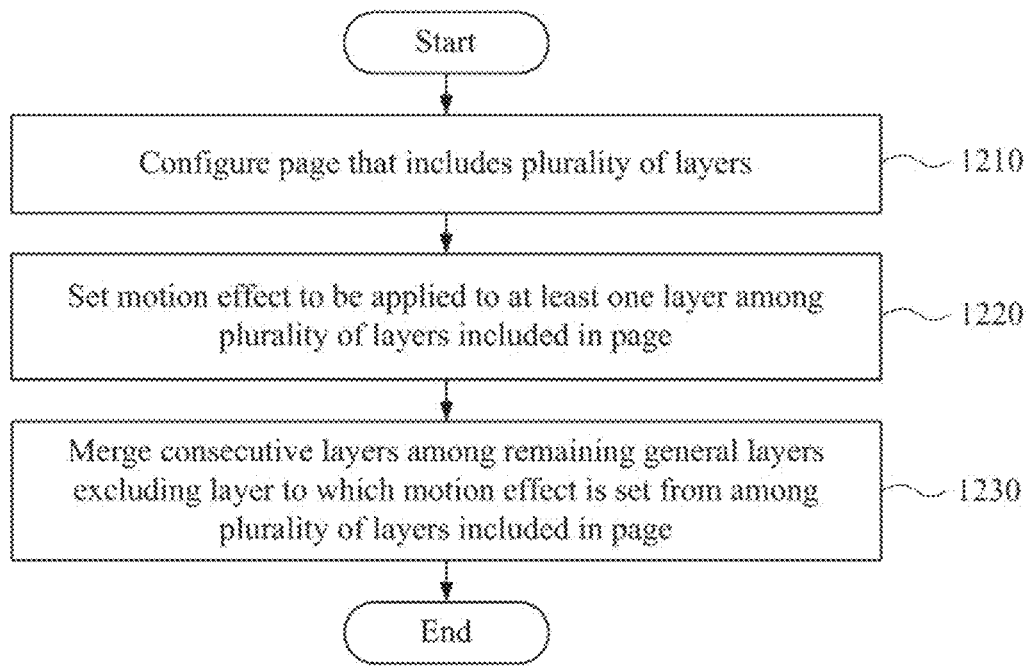
FIG. 12 is a flowchart illustrating a content providing method according to one embodiment.

FIG. 11 is a block diagram illustrating a content providing system according to one exemplary embodiment, and FIG. 12 is a flowchart illustrating a content providing method performed by the content providing system of FIG. 11. Referring to FIG. 11, the content providing system 1100 includes one or more computing devices, such as a server, that include a processor 1110, a bus 1120, a network interface 1130, and a memory 1140. The memory 1140 includes an operating system (OS) 1141 and a content providing routine 1142. The processor 1110 includes computer-readable instructions for specially programming the processor 1110 as a page configurer 1111, a motion effect setter 1112, and a layer merger 1113. According to other embodiments, the content providing system 1100 may include a greater or lesser number of constituent elements than the number of constituent elements shown in FIG. 11. However, there is no need to clearly illustrate many constituent elements according to the related art. For example, the content providing system 1100 may include other constituent elements such as a display, a transceiver, etc.

The memory 1140 includes a permanent mass storage device, such as a random access memory (RAM), a read only memory (ROM), a disc drive, a solid state drive, an optical drive, etc., as a computer-readable storage medium. Also, program codes (e.g., computer readable instructions) for the OS 1141, the content providing routine 1142, the computer readable instructions associated with the page configurer 1111, the motion effect setter 1112, and/or the layer merger 1113, etc., may be stored in the memory 1140. Such software constituent elements may be loaded from another computer-readable storage medium separate from the memory 1140 using a drive mechanism (not shown). The other computer-readable storage medium may include, for example, a floppy drive, a disc, a tape, a DVD/CD-ROM drive, a memory card, etc. Software constituent elements may be loaded to the memory 1140 through the network interface 1130 instead of, or in addition to, the other computer-readable storage medium. For example, the content providing routine 1142 may be loaded to the memory 1140 through a program installed by files provided from developers over a network.

The bus 1120 enables communication and data transmission between the constituent elements of the content providing system 1100. The bus 1120 may be configured using a high-speed serial bus, a parallel bus, a storage area network (SAN), and/or another appropriate communication technology.

The network interface 1130 may be a computer hardware constituent element for connecting the content providing system 1100 to the computer network. The network interface 1130 may connect the content providing system 1100 to the computer network through a wireless and/or wired connection.

The processor 1110 may be configured to process computer-readable instructions of a computer program by performing basic arithmetic operations, logic operations, and input/output operations of the content providing system 1100. The computer-readable instructions may be provided from the memory 1140 and/or the network interface 1130 to the processor 1110 through the bus 1120. The processor 1110 is configured to execute program codes for the page configurer 1111, the motion effect setter 1112, and/or the layer merger 1113. The program codes may be stored in a storage device such as the memory 1140, for example, in the content providing routine 1142.

When executed by the processor 1110, the page configurer 1111, the motion effect setter 1112, and/or the layer merger 1113 transform the processor 1110 into a special purpose processor configured to perform operations 1210 through 1230 of FIG. 12.

The content providing system 1100 may correspond to the creator terminal 110 of FIG. 1 creating content through an authoring tool, or may be the media 120 of FIG. 2 creating content through a web authoring tool.

In operation 1210, the page configurer 1111 configures a page that includes a plurality of layers. Herein, to achieve merging of layers, a page including two or more layers is employed instead of a page including a single layer. Each of the layers may include a layer image to be displayed on the page. The layer image may be provided in a form of a text.

In operation 1220, the motion effect setter 1112 sets a motion effect to be applied to at least one layer among the plurality of layers included in the page. The motion effect may include an action to be applied to a layer image based on a preset condition when the page is displayed on a screen. A variety of effects, such as a sound effect, a vibration of a mobile device, etc., may be applicable to the layer or the page. Here, a display effect associated with merging layers may be a motion effect, such as movement, rotation, appearance and disappearance of an image.

In operation 1230, the layer merger 1113 merges consecutive layers among remaining general layers excluding a layer to which the motion effect is set from among the plurality of layers included in the page when creating the content including the page. For example, the layer merger 1113 may verify layers sequentially from the bottom layer to the top layer or from the top layer to the bottom layer among the plurality of layers, may create a single merged image by merging consecutive general layers to which the motion effect is not set, and may create a layer to which the motion effect is set into an individual image. An example of creating merged images and individual images is described with reference to FIG. 5 and thus, further description related thereto will be omitted here.

Although not illustrated, the content providing method may, selectively, further include creating a final image in which the merged images and the individual images are stacked in order of the layers. The orders of layers are important since the top layer may cover a portion of or all of the bottom layer. Accordingly, the created images may be stacked in order of the layers and the bottom layer may be displayed using a marginal portion of the top layer. This operation may be performed by a final image creator 1114 further includable in the processor 1110.

By merging layers to which the motion effect is not set, it is possible to reduce the resource size of the final image and, accordingly, reduce the network usage amount, and to enhance the loading performance at the user terminal 130.

In addition, although not illustrated, the content providing method may, selectively, further include recognizing the second size of an area having the same color as the color of a background from the page when the size of the page is greater than or equal to a first size and segmenting the page based on the recognized area. A method of segmenting an area having the same color as a color of a background is described above with reference to FIG. 8 and thus, a further description related thereto will be omitted here. These operations may be performed by a background recognizer 1115 and a page segmenter 1116 further includable in the processor 1110.

As described above, since at least a preset size of a page is segmented in association with a color of a background, it is possible to enhance the loading performance at the user terminal 130 within the intent of a creator.

Figure 13:
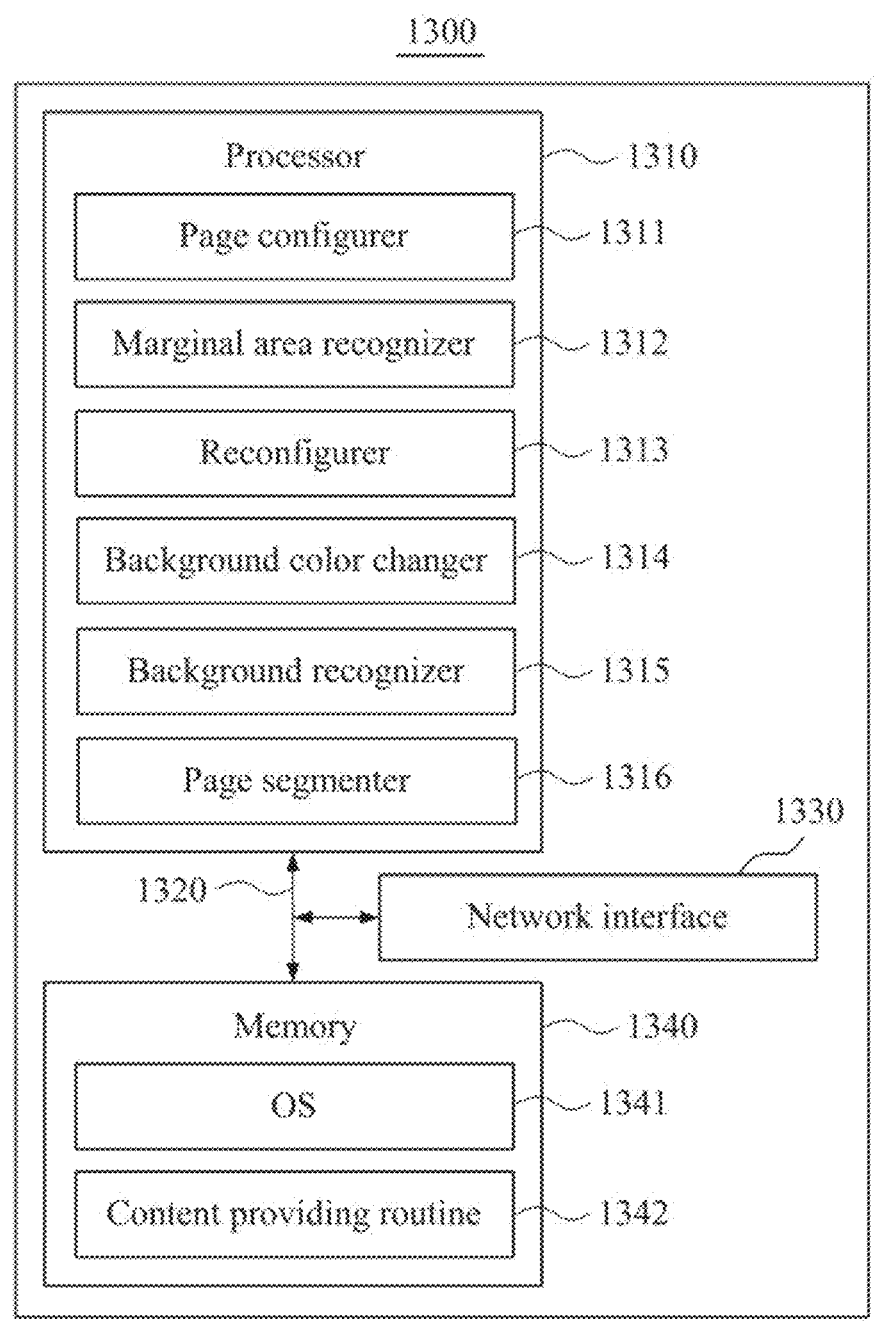
FIG. 13 is a block diagram illustrating another content providing system according to another exemplary embodiment.
Figure 14:
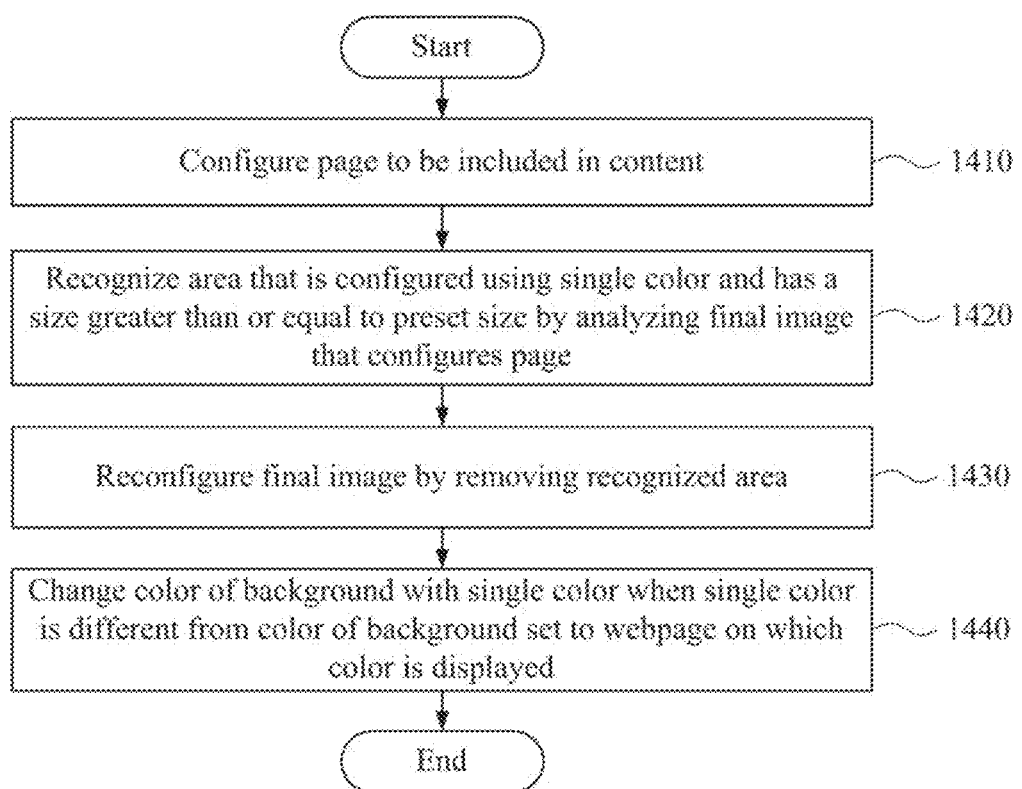
FIG. 14 is a flowchart illustrating another content providing method according to one embodiment.

FIG. 13 is a block diagram illustrating a content providing system according to another exemplary embodiment, and FIG. 14 is a flowchart illustrating a content providing method performed by the content providing system of FIG. 13.

Referring to FIG. 13, the content providing system 1300 includes a processor 1310, a bus 1320, a network interface 1330, and a memory 1340. The bus 1320, the network interface 1330 and the memory 1340 correspond in function to the bus 1120, the network interface 1130, and the memory 1140 of the content providing system 1100 of FIG. 11, respectively, and thus, a repeated description is omitted.

The processor 1310 includes computer-readable instructions for specially programming the processor 1310 as a page configurer 1311, a marginal area recognizer 1312, and a reconfigurer 1313, and if necessary, may further include a background color changer 1314. The constituent elements included in the processor 1310 are configured to perform operations 1410 through 1440 of FIG. 14.

In operation 1410, the page configurer 1311 configures a page to be included in content. The "page" used herein may refer to a page that includes a plurality of layers and may refer to a page of an image that includes a single layer.

In operation 1420, the marginal area recognizer 1312 recognizes an area that is configured using a single color and has a size greater than or equal to a preset size by analyzing the final image that configures the page.

In operation 1430, the reconfigurer 1313 reconfigures the final image by removing the recognized area. As described above with reference to FIGS. 9 and 10, it is possible to reduce the resource size of the final image by recognizing and removing the area configured using the same color.

Here, when a single color is the same as the color of a background set to a service page on which the content is displayed, the color of the background of the service page may be displayed on a margin created by simply removing the recognized area. Thus, it is possible to display the same image without a special change and while reducing the size of the image.

In operation 1440, when the single color is different from the color of the background set to the service page on which the content is displayed, the background color changer 1314 may change the color of the background set to the service page with the single color, for example, a color of the removed area. That is, the changed color of the background may be displayed on the margin created by removing the recognized area. Since the changed color is the color of the removed area, it is possible to provide a user with the same content while reducing the size of the image. Operation 1440 may be selectively included in the content providing method based on example embodiments.

Further, although not illustrated, the content providing method may, selectively, further include recognizing the second size of an area having the same color as the color of the background when the size of the page is greater than or equal to the present first size and segmenting the page based on the recognized second size of the area. A method of segmenting a page based on an area having the same color as the color of a background is described above with reference to FIG. 8 and thus, a further description related thereto will be omitted here. These operations may be performed by a background recognizer 1315 and a page segmenter 1316 further includable in the processor 1310.

As described above, since at least the preset size of a page is segmented in association with the color of a background, it is possible to enhance the loading performance at the user terminal 130 within the intent of a creator.

According to example embodiments, it is possible to provide content including a motion effect by applying the motion effect to at least one layer on a page having a plurality of layers, and to enhance the loading performance of providing content and to reduce the network usage rate by merging layers to which the motion effect is not applied into a single image.

Also, according to example embodiments, it is possible to configure content by automatically recognizing the preset size of an area having the same color as a color of a background and by automatically segmenting and, thereby, storing a page based on the recognized area when the size of the page is greater than or equal to the preset size.

Also, according to example embodiments, it is possible to reduce the resource size of the final image and the network usage rate, and to enhance the loading performance by removing a specific color of an area from the final image and by providing content to display the color of a background set to a service page on which content such as webtoons is displayed through the removed area, when the preset size of an area having the specific color is present on the final image.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method, executed on at least one computer, for providing content on a service page on a display, the method comprising:
   configuring a content page having an area with at least one object and an area without an object, to be included in content;
   displaying the content page on the service page on the display;
   recognizing an area of the content page having a single color by analyzing a final image that configures the content page;
   determining whether the single color of the recognized area of the content page is a same as a color of the service page; and
   segmenting the final image into multiple content pages by removing the recognized area of the content page when the single color of the recognized area is the same as the color of the service page, so that the color of the service page is displayed through the recognized area removed from the content page.

2. The method of claim 1, further comprising reconfiguring the final image by removing the recognized area and changing the color of the service page to the color of the recognized area when the single color of the recognized area is different from the color of the service page.

3. The method of claim 2, wherein when the single color of the recognized area is different from the color of the service page,
   the changed color of the service page is displayed through a margin created by removing the recognized area.

4. The method of claim 1,
   wherein the segmenting of the final image is performed in response to a size of the content page being greater than or equal to a preset first size.

5. The method of claim 1, wherein the service page is a webpage.

6. A non-transitory computer-readable medium storing a program to implement a content providing method for providing content on a service page on a display, the program enabling at least one computer to perform the steps comprising:
   configuring a content page having an area with at least one object and an area without an object, to be included in content;
   displaying the content page on the service page on the display;
   recognizing an area of the content page having a single color by analyzing a final image that configures the content page;
   determining whether the single color of the recognized area of the content page is a same as a color of the service page; and
   segmenting the final image into multiple content pages by removing the recognized area of the content page when the single color of the recognized area is the same as the color of the service page, so that the color of the service page is displayed through the recognized area removed from the content page.

7. The non-transitory computer-readable medium of claim 6, wherein the content providing method further comprises reconfiguring the final image by removing the recognized area and changing the color of the service page to the color of the recognized area when the single color of the recognized area is different from the color of the service page.

8. The non-transitory computer-readable medium of claim 7, wherein when the single color of the recognized area is different from the color of the service page,
   the changed color of the service page is displayed through a margin created by removing the recognized area.

9. The non-transitory computer-readable medium of claim 6, wherein the
   segmenting of the final image is performed in response to the size of the content page being greater than or equal to a preset first size.

10. The non-transitory computer-readable medium of claim 6, wherein service page is a webpage.

11. A content providing system, executed on at least one computer, for providing content on a service page on a display, the system comprising:
    a page configurer configured to configure a content page to be included in content, and display the content page on the service page on the display;
    a marginal area recognizer configured to recognize an area of the content page having a single color by analyzing a final image that configures the content page, and determine whether the single color of the recognized area of the content page is a same as a color of the service page; and
    a reconfigurer configured to segment the final image into multiple content pages by removing the recognized area of the content page when the single color of the recognized area is the same as the color of the service page, so that the color of the service page is displayed through the recognized area removed from the content page.

12. The content providing system of claim 11, wherein the reconfigurer configured to reconfigure the final image reconfigures the final image by removing the recognized area and changing the color of the service page to the color of the recognized area when the single color of the recognized area is different from the color of the service page.

13. The content providing system of claim 12, wherein when the single color of the recognized area is different from the color of the service page,
    the changed color of the service page is displayed through a margin created by removing the recognized area.

14. The content providing system of claim 11,
    wherein the segmenting of the final image is performed in response to a size of the content page being greater than or equal to a preset first size.

15. The content providing system of claim 11, wherein the service page is a webpage.

* * * * *